United States Patent [19]

Grimaldi

[11] Patent Number: 4,794,627
[45] Date of Patent: Dec. 27, 1988

[54] PROCESS FOR THE PARALLEL-SERIES CODE CONVERSION OF A PARALLEL DIGITAL TRAIN AND A DEVICE FOR THE TRANSMISSION OF DIGITIZED VIDEO SIGNALS USING SUCH A PROCESS

[75] Inventor: Jean L. Grimaldi, Paris, France

[73] Assignee: Thomson-CSF, Paris, France

[21] Appl. No.: 326,546

[22] Filed: Dec. 2, 1981

[30] Foreign Application Priority Data

Dec. 5, 1980 [FR] France ................................. 80 25907

[51] Int. Cl.$^4$ ............................................. H04L 3/00
[52] U.S. Cl. ....................................... 375/114; 375/19;
341/95; 341/101
[58] Field of Search .......................... 375/110, 114, 19;
340/347 DD; 371/2, 65, 68; 358/263, 264

[56] References Cited

U.S. PATENT DOCUMENTS

| | | | |
|---|---|---|---|
| 2,950,469 | 8/1960 | Raasch | 340/347 DD |
| 3,215,779 | 11/1965 | Halm et al. | 375/111 |
| 3,631,471 | 12/1971 | Griffiths | 340/347 DD |
| 3,753,113 | 8/1973 | Maruta et al. | 340/347 DD |
| 4,352,129 | 9/1982 | Baldwin | 340/347 DD |
| 4,387,364 | 6/1983 | Shirota | 340/347 DD |

FOREIGN PATENT DOCUMENTS

| | | | |
|---|---|---|---|
| 2462068 | 7/1980 | France | 340/347 DD |
| 1089551 | 11/1967 | United Kingdom . | |
| 1540617 | 2/1979 | United Kingdom . | |
| 1569076 | 6/1980 | United Kingdom . | |
| 2041702 | 9/1980 | United Kingdom . | |

OTHER PUBLICATIONS

Nachrichtentechnische Zeitschrift (N.T.Z.), vol. 27, No. 6, 1974, M. Caflisch et al: "Leistungsspektren von Blockcodes", pp. 219–224.

*Primary Examiner*—Benedict V. Safourek
*Assistant Examiner*—Stephen Chin
*Attorney, Agent, or Firm*—Oblon, Fisher, Spivak, McClelland & Maier

[57] ABSTRACT

The process for the code conversion of eight parallel bits into words with nine series bits uses among the nine-bit words on the one hand those having five "1" and four "0" and which do not have five consecutive bits and whereof none starts or finishes with four identical bits, as well as their complements to 1, and on the other words having six "1" and three "0" with a maximum of transitions, as well as their complements to 1. Two complementary digital frame synchronization words are chosen from among the nine-bit words not retained for coding and which are not found in a random series of coded words.

2 Claims, 1 Drawing Sheet

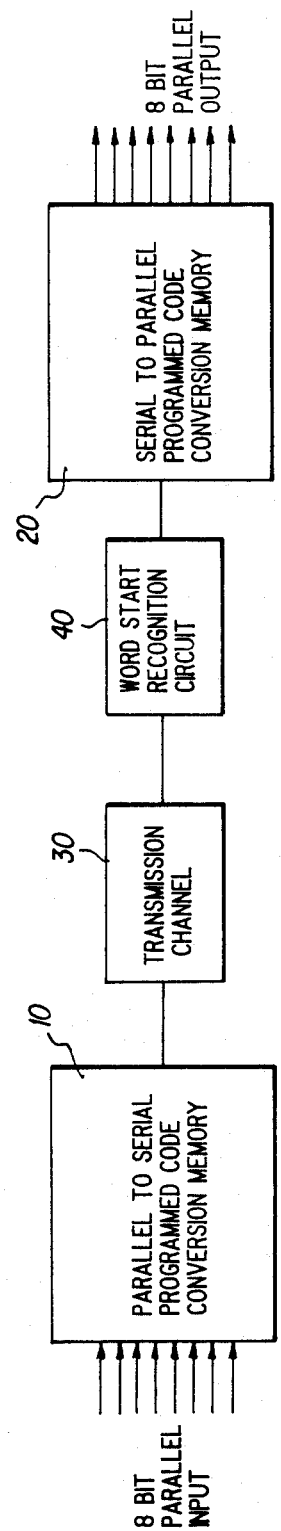

PROCESS FOR THE PARALLEL-SERIES CODE CONVERSION OF A PARALLEL DIGITAL TRAIN AND A DEVICE FOR THE TRANSMISSION OF DIGITIZED VIDEO SIGNALS USING SUCH A PROCESS

BACKGROUND OF THE INVENTION

The invention relates to the processing of digitized video signals and more particularly to a process for the code conversion of a video digital train of eight parallel bits and a device for transmitting digitized video signals using such a process.

In so-called digital television, video signals are transmitted in the form of a train of eight-bit words resulting from the two-state coding by non-return to zero (NRZ) of the video signal on 256 levels. Such signals can be processed as they are in a reception station, but in certain cases and in for example local distribution networks, they are transmitted in the form of a bit series sequence. When this retransmission is carried out by means of a coaxial cable, it is possible to use parallel-series conversion devices utilizing a code conversion process which employs a ternary code (three possible states for coding the two levels 1 and 0). They reduce the necessary band, but use a signal with three levels for easily reconstituting the timing of the bits. Such devices are difficultly realizable for transmission using optical cables because it is difficult to transmit three levels on such cables. However, there are fewer pass band limitations in the case of optical fibre devices.

BRIEF SUMMARY OF THE INVENTION

The invention relates to a parallel-series code conversion process, which can be more particularly used in the transmission of digitized video signals on optical fibre cables in which the bits are coded on two levels. As a result of a slight band increase the series binary signal has a quasi-constant mean value and an abundance of transitions making it possible to reconstitute the timing of the bits.

The present invention therefore relates to a process for the code conversion of a digital train of eight parallel bits, wherein these words are coded as words with nine series bits chosen in a subset of the set of $2^9$ words of nine bits comprising on the one hand words $X_i$ with a five-four format, i.e. five "1"-four "0" and five "0"-four "1", which do not have five identical consecutive bits and which do not start or finish with four identical bits, $i=1$ to 226 and on the other hand words $Y_i$ formed from six "1" and three "0" and their complements to 1, $Z_j$, $j=1$ to 29 chosen from among the set of words with a six-three format for having a maximum of transitions, and at least one supplementary digital frame synchronization word which is not encountered in a random sequence of the words defined hereinbefore.

The invention also relates to a device for transmitting digitized video signals utilizing such a process.

BRIEF DESCRIPTION OF THE DRAWING

The FIGURE illustrates a block diagram for the apparatus used to accomplish the conversion process according to the invention.

DETAILED DESCRIPTION OF THE PREFERRED EMBODIMENTS

The invention will be better understood and further features will be gathered from the following specific description.

The digitized video signal in the form of a parallel train of eight bits at frequency $F_p$ must be transformed for its series transmission into a single signal at a timing $F_s$ equal to or above $8F_p$. For this purpose the digitized video signal must be coded and this coding must comply with a certain number of criteria.

Firstly the series signal must have sufficient transitions to enable the clock with timing $F_s$ to be reconstituted without any significant increase in the pass band.

In addition, the mean value of the series signal must be quasi-constant and equal to half the amplitude of one bit. Thus, in a transmission system where low frequencies are not transmitted and where the added noise is the same on the two levels emitted, the variation between the mean value of the signal and the value half tends to decrease the immunity of the transmission channel to noise and therefore to increase the error rate for a constant emitted power. It is therefore desirable for the mean value of the series signal to be as close as possible to half the amplitude of one bit.

Finally the code must provide the possibility of introducing a synchronization sequence for the digital frame in order to facilitate the recognition of the start of a word in the series train and therefore protect the system against errors during decoding by the recognition of said digital frame synchronization sequence.

The aforementioned code conversion process which transforms words with eight parallel bits into words with nine series bits makes it possible to obtain a signal conforming with the aforementioned criteria.

As stated hereinbefore the symbols 0 and 1 are coded by means of the NRZ code. The code conversion process according to the invention makes $2^8$ words formed from nine bits chosen from among the $2^9$ possible words to the $2^8$ possible words of the parallel digital train of eight bits. The nine bits of each of these words are transmitted in series.

In the set formed by the nine-bit words a distinction can be made inter alia between:
  126 words formed by four "1" and five "0"
  126 words formed by five "0" and four "1"
  84 words formed by six "1" and three "0"
  84 words formed by three "1" and six "0"

The words of format four "1" and five "0" or five "1"-four "0", called hereinafter words with a four-five format, have a mean value over nine bits which is close to half the amplitude of one bit. Therefore, a random sequence of four-five format words has a mean value relative to a large number of words equal to half the amplitude of one bit.

Words of format six "0"-three "1" or three "0"-six "1", hereinafter called six-three format words have between the mean value for nine bits and the value, a significant variation. However, a set of two words, a six "0"-three "1" format and the other of three "0"-six "1" format has a mean value precisely equal to ½.

Therefore the nine bit words used will be chosen from among the four-five format words or from the six-three format words, but in the latter case an eight bit word will be coded by a six "0"-three "1" format word or by its complement to 1 as a function of whether in the preceding coded words the last word of six-three format was a six "0"-three "1" or three "0"-six "1" word.

Thus, the mean value of the signal will always be quasi-constant and equal to ½. Moreover, to obtain a series signal having sufficient transitions for the timimg to be easily recovered and with the first criterion verified, it is necessary to eliminate the words not having sufficient transitons. For this purpose words starting or finishing with four or more consecutive identical bits are eliminated from the set of previously retained nine bit words. Thus, two random words in series will never have more than six consecutive, identical bits. Moreover, the nine bit words having a sequence of five or more identical bits will also be eliminated. Thus, 26 words are eliminated from the five-four format words. The words of format four "1"-five "0" removed from the alphabet of the code in accordance with the above criteria are as follows:

Words with four "1"-five "0" excluded:

| 000001111 | 111100000 | 000010111 | 000011101 |
|-----------|-----------|-----------|-----------|
| 000011110 | 011110000 | 101110000 | 110010000 |
| 111010000 | 100000111 | 110000011 | 111000001 |

Their complements to 1 of format five "1"-four "0" are also removed from the code alphabet.

Among the 252 possible words of format five-four, 226 words are consequently retained, i.e. $X_i$, i=1 to 226. For the coding of 256 possible eight-bit words 30 are left and it is necessary to attribute to them a six-three format word. These words are chosen in accordance with the criterion of the maximum number of transitions. In practice, the synchronization background corresponding to the level 0 is coded by a particular synchronization word to be determined, so that there are 29 words of six-three format having a maximum of transitions to be selected. For example the retained words $Y_j$, j=1 to 29 of format six "1"-three "0" are as follows:

Words $Y_j$ six "1"-three "0" retained:

| 010111101 | 110011011 | 101111010 | 011101101 |
|-----------|-----------|-----------|-----------|
| 011011011 | 101110110 | 011110101 | 110110011 |
| 101101101 | 101011101 | 101011110 | 010111101 |
| 011011101 | 110111010 | 010110111 | 110101110 |
| 101011011 | 101010111 | 101101011 | 011101011 |
| 11010110  | 111010101 | 110101011 | 111010110 |
| 110110101 | 111011010 | 110101101 | 101101110 |
|           |           |           | 101110101 |

Their complements to 1, $Z_j$, j=1 to 29 are also words in the set, a word f six "1"-three "0" and its complement to 1 coding the same word with eight parallel bits.

The digital frame synchronization word is chosen from the set of nine-bit words in such a way that it will never be obtained by replacing end to end two random words of the previously defined alphabet.

The following table represents the words having this characteristic and obtained by a systematic investigation in the words with a five-four format, words with a six-three format and words with a seven-two format.

| 011111110 | = | S |
|-----------|---|---|
| 100000001 | = | S̄ |
| 110000000 |   |   |
| 001111111 |   |   |
| 000000011 |   |   |
| 111111100 |   |   |

All these possible words are of seven-two format and consequently two of them are chosen, one being the complement to 1 of the other. In the adopted embodiment the first two words S and S̄ have been used.

In the particular case of digital signals representing a video signal, there are preferred times for introducing the digital frame synchronization words. These preferred times are conventional synchronization times of analog video signals, line synchronization pulses and framesynchronization pulses. Moreover, as these synchronizations form part of the signal to be transmitted, it is possible to bring about coincidence between the synchronization to be transmitted and the digital frame synchronization particularly intended for processing digital signals. During these synchronization times when the video level is 0, a synchronization sequence $S\bar{S}S\bar{S}$ is transmitted for the entire duration of the synchronization pulse.

Thus, all the nine-bit words making it possible to code the parallel words of eight bits are determined. In a final phase it is a question of attributing to each eight-bit word a five-four format word or two complementary six-three format words. This attribution is carried out by taking account of the particular format of the analog video signals and the corresponding digitized video signals. Thus, in the digitized video signal coded on eight parallel bits the levels 0 to 3 are reserved for synchronization, 0 being as stated hereinbefore the synchronization background level. The normal video amplitude varies between levels 16 and 240. The levels between 4 and 15 on the one hand and 241 and 255 on the other are used for coding possible overflows. In order that the mean value of the series signal remains quasi-constant and qual to half the amplitude of one bit, the five-four format words are attributed in a preferred manner to the coding of levels between 16 and 240. The other words of six-three format code the uncoded words between 16 and 240 and the words corresponding to overflows between 4 and 15 and between 241 and 255. The precise correspondence table between these eight-bit words and the nine-bit words retained in the manner indicated hereinbefore is then stored.

The series digital signal after code conversion is therefore in the form:

$$X_1X_2X_3X_1X_4X_5X_6X_7X_8X_9 \ldots S\bar{S}S\bar{S}$$

The previously described code conversion consequently satisfies the three criteria referred to hereinbefore, namely mean component of the quasi-constant series signal, abundance of transitions of the series signal for the reconstitution of the timing and the presence of a digital frame synchronization sequence which cannot be found in the series train.

This device can advantageously be used in optical fibre transmissions, but also in coaxial cable transmissions. It makes it possible to minimize the complexity of the receiver because it does not require the transmission of the continuous component of the digital signal. Furthremore the considerable abundance of transitions of the transmitted signal may make it possible to simplify the clock timing recovery systems. The choice of the digital frame synchronization word, as well as its location in the series video digital signal provide an excellent protection against transmission errors linked with possibly inadequate knowledge of the information regarding the word starts in the series train. Thus, this parallel-series code conversion process can be used in a digitized video signal transmission device in which optionally relatively simple correlation methods permit a perfect protection of the word start information, because the latter can be known even with a poor error rate.

The transmission device as shown in the FIGURE comprises two programmed code conversion memories 10, 20, one of the memories 10 coupled to the input of the transmission channel 30 supplying the series signal after code conversion and the other memory 20 coupled to the output of the transmission channel via a word start information recognition circuit 40 for restoring the parallel digital train on the basis of the series signal.

The invention is not limited to the parallel-series code conversion process described hereinbefore, which relates to an eight bit-nine bit code conversion. It is also possible to realize a code conversion process for eight-bit words into ten-bit words. In this case the words of the set of ten-bit words retained on a preferred basis are obviously words of a five "1"-five "0" format, whose mean component is constant over one word. As indicated for the code conversion process described hereinbefore words having five consecutive identical bits and words having four consecutive bits at the start or finish of the ten-bit words are excluded from the retained words. If the five-five format words retained are inadequate, supplementary words of six-four format may optionally be sought from the alphabet of the ten-bit words. Such as eight bit-ten bit parallel-series code conversion process would be easier to realize in view of the requisite criteria, particularly the criterion regarding the constant value of the mean component. However, due to the fact that an eight-bit word is transmitted on ten bits in series, the necessary pass band increases in a ratio of 10:8 compared with the initial source, whereas the code referred to hereinbefore only increases this band in a ratio 9:8.

What is claimed is:

1. A process for the code conversion of words having a digital train of eight parallel bits, comprising the steps of:

choosing a first subset $X_i$ of words of nin series bits which have a five-four format, i.e. five "1"-four "0" and five "0"-four "1", and which do not have five identical consecutive bits and which do not start or finish with four identical bits with i=1 to 226;

choosing a second subset $Y_j$ of words of nine series bits formed from a format of six "1" and three "0" and their complements to 1, $Z_j=1$ to 29 chosen from among the set of words with a six-three format for having a maximum number of transitions;

selecting at least one supplementary digital frame synchronization word which isw not encountered in a random sequence of said chosen first and second subsets; and coding said words of eight parallel bits as words of nine series bits with said series bits consisting of said first subset, said second subset and said at least one supplementary digital frame synchronization word wherein each word $X_i$ corresponds to a word to be coded, and wherein a word $Y_j$ and its complement to 1, $Z_j$, both correspond to the same word to be coded, and $Y_j$ or $Z_j$ is retained for the coding of the corresponding word as a function of whether the closest word also coded by a six-three format word in the already coded sequence has been respectively coded by a word $Z_j$ or a word $Y_j$ in order that the mean value of the series signal is quasi-constant;

wherein the parallel digital train results from the digitization of a video signal coded on $2^8$ levels, wherein the digital frame synchronization is introduced during synchronization pulses and corresponds to the 0 level of the video signal, and wherein two complementary synchronization words S and $\bar{S}$ of seven-two format having seven identical consecutive bits being alternately transmitted to code the 0 level and form the digital frame synchronization sequences.

2. A process for the code conversion of words having a digital train of eight parallel bits, comprising the steps of:

choosing a first subset $X_i$ of words of nin series bits which have a five-four format, i.e. five "1"-four "0" and five "0"-four "1", and which do not have five identical consecutive bits and which do not start or finish with four identical bits with i=1 to 226;

choosing a second subset $Y_j$ of words of nine series bits formed from a format of six "1" and three "0" and their complements to 1, $Z_j=1$ to 29 chosen from among the set of words with a six-three format for having a maximum number of transitions;

selecting at least one supplementary digital frame synchronization word which is not encountered in a random sequence of said chosen first and second subsets; and coding said words of eight parallel bits as words of nine series bits with said series bits consisting of said first subset, said second subset and said at least one supplementary digital frame synchronization word wherein each word $X_i$ corresponds to a word to be coded, and wherein a word $Y_j$ and its complement to 1, $Z_j$, both correspond to the same word to be coded, and $Y_j$ or $Z_j$ is retained for the coding of the corresponding word as a function of whether the closest word also coded by a six-three format word in the already coded sequence has been respectively coded by a word $Z_j$ or a word $Y_j$ in order that the mean value of the series signal is quasi-constant;

wherein the digital train of eight-bit words results from the digitization of a video signal with $2^8$ coded levels on eight parallel bits, wherein the words $X_i$ of five-four format are chosen in preferred form for coding levels 1 to 3 reserved for synchronization and levels between 16 and 240, and wherein the words $Y_j$ and $Z_j$ of six-three format being used for coding the eight-bit words correspond to levels 4 to 15 and 241 to 255 often present in the signal.

* * * * *